United States Patent [19]

Rheingold

[11] Patent Number: 4,795,014

[45] Date of Patent: Jan. 3, 1989

[54] POWER TRANSMISSION APPARATUS

[76] Inventor: Lawrence M. Rheingold, 3181 Ann St., Baldwin, N.Y. 11510

[21] Appl. No.: 927,043

[22] Filed: Nov. 3, 1986

[51] Int. Cl.$^4$ .............................................. F16D 31/02
[52] U.S. Cl. ....................................... 192/60; 280/200
[58] Field of Search ................ 192/60, 59; 188/295; 280/200, 216; 301/105 B

[56] References Cited

U.S. PATENT DOCUMENTS

| | | | |
|---|---|---|---|
| 1,466,622 | 8/1923 | Hele-Shaw | 192/60 |
| 1,609,429 | 12/1926 | Rockwell | 192/60 |
| 1,786,356 | 12/1930 | McFarland | 192/60 |
| 1,952,354 | 3/1934 | Bedford | 192/60 |
| 2,125,617 | 8/1938 | Niemann | 192/58 B |
| 2,153,372 | 4/1939 | Hyde | 192/60 X |
| 3,083,803 | 4/1963 | Gilles | 192/60 |

FOREIGN PATENT DOCUMENTS 948642  8/1949  France ..................... 192/60

*Primary Examiner*—Rodney H. Bonck
*Attorney, Agent, or Firm*—Fitch, Even, Tabin & Flannery

[57] ABSTRACT

A transmission wherein power is transmitted between a camshaft and a rotating cylinder block through a pair of pistons reciprocally and slidably disposed within a pair of adjacent cylinders in the cylinder block. In one mode of operation, the transmission provides a direction connection between the camshaft and the cylinder block. In this mode of operation, the pistons are prevented from moving relative to the cylinder block and accordingly rotate therewith, and the camshaft and the cylinder block rotate at the same velocity. In a second mode of operation, the relative speeds of the camshaft and the cylinder block are varied with respect to one another, and the pistons are driven in reciprocating movement 180° out of phase with one another by a pair of cams disposed eccentrically on the camshaft and fixed thereto. The interiors of the adjacent cylinder heads communicate with one another through a pair of variable position valves disposed therebetween which regulate the flow by providing an orifice of variable size.

In a preferred embodiment of the invention, a slurry is disposed within the cylinder heads and pumped between adjacent cylinder heads through the valves by the action of the pistons. The slurry preferably comprises a plurality of small, solid spheres immersed in a lubricating fluid such as oil.

5 Claims, 4 Drawing Sheets

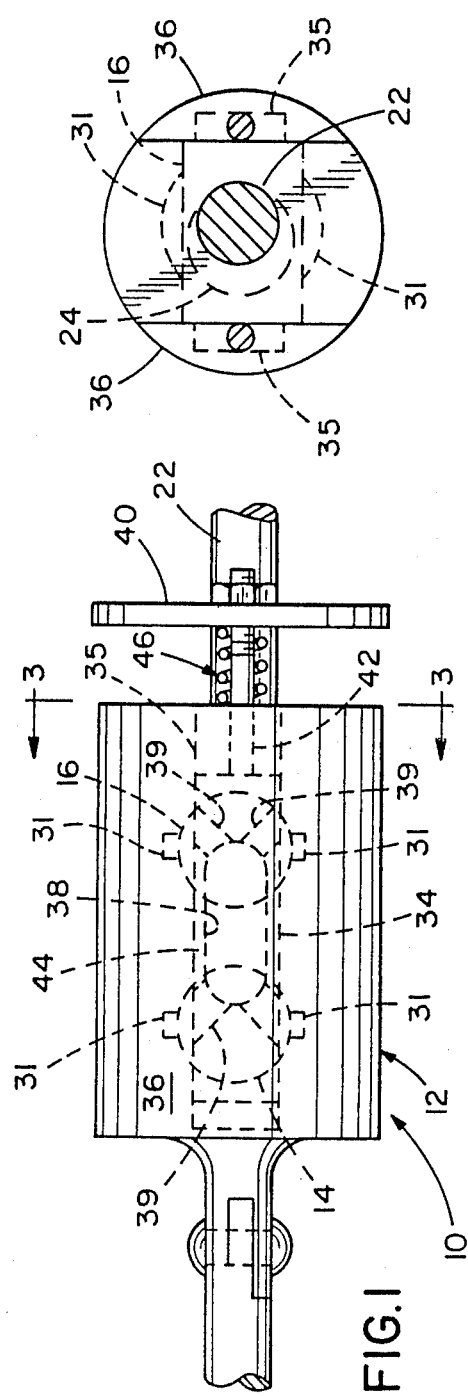
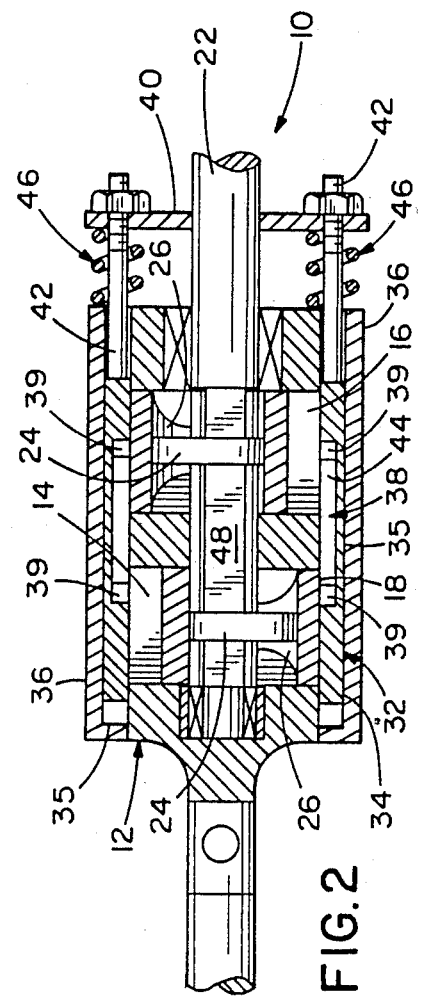

POWER TRANSMISSION APPARATUS

The invention relates generally to power transmission apparatus, and more particularly to transmission apparatus providing a variable relationship between driving and driven elements. The apparatus of the invention is particularly suitable for use as a bicycle transmission.

A bicycle transmission should generally be lightweight and variable, and capable of relatively economical manufacture. Such a transmission should also have relatively low frictional losses, and be capable of quiet operation. Conventional variable-ratio bicycle transmissions typically include a roller chain transmitting power from a sprocket on the pedal crank of the bicycle to a sprocket on the rear wheel axle, with multiple sprockets being provided on the rear wheel axle and/or the pedal crank to provide variability. One or more derailleurs are provided to shift the chain between the sprockets, and means are provided for taking up slack in the chain.

The transmission of the invention provides an alternative to the conventional variable-ratio bicycle transmission.

SUMMARY OF THE INVENTION

In accordance with the present invention, a transmission is provided wherein power is transmitted between a camshaft and a rotating cylinder block through a pair of pistons reciprocally and slidably disposed within a pair of adjacent cylinders in the cylinder block. The transmission is configured to provide two modes of relative movement between the input shaft, the pistons and the cylinder block. For illustrative purposes, the invention will be described with reference to an embodiment wherein the camshaft is the driving member and the cylinder block is the driven member, However, it should be understood that these functions can be reversed. In one mode of operation, the transmission provides a direct connection between the camshaft and the cylinder block. In this mode of operation, the pistons are prevented from moving relative to the cylinder block, and accordingly rotate therewith, and the camshaft and the cylinder block rotate at the same velocity. In a second mode of operation, the relative speeds of the camshaft and the cylinder block are varied with respect to one another, and the pistons reciprocate at a frequency equal to the difference between the respective speeds.

In the second mode, the pistons are driven in reciprocating movement 180° out of phase with one another by a pair of cams disposed eccentrically on the camshaft and fixed thereto. In the illustrated embodiment, the cams slidably engage non-circular interior surfaces of the pistons. Each of the pistons has a uniquely-shaped transverse bore extending therethrough. The bore is of substantially circular cross-section at its ends, and has a central counterbore of non-circular cross-section. Torque exerted on the camshaft results in axial force on the pistons, and torque on the cylinder block that varies as a function of resistance to reciprocation of the pistons. The interiors of the adjacent ends of the cylinders communicate with one another through a pair of variable-position valves disposed therebetween which regulate flow by providing orifices of variable size.

To effect operation in the first mode described above, the valves are closed, preventing flow between the cylinder interiors, and thereby preventing movement of the pistons relative to the cylinder block. In this mode of operation, the cylinder block rotates at a speed equal to that of the input shaft. To effect operation in the second mode, the valves are opened to permit flow of fluid between the cylinder interiors, thus permitting reciprocation of the pistons within the cylinder block, and permitting a differential between the input shaft speed and the rotational velocity of the cylinder block. The valves are continuously adjustable through a predetermined range of open positions. This permits adjustment of flow resistance between the cylinders to enable selection of a desired differential between the respective rotational velocities of the input shaft and the cylinder block.

In one preferred embodiment, the fluid comprises a slurry composed of a plurality of relatively small solid spheres immersed in a fluid such as oil.

Preferably, each valve comprises a linearly displaceable sliding gate with an orifice or cavity therein of sufficient length to connect the cylinders.

Further features of the invention are set forth below and shown in the accompanying drawings.

BRIEF DESCRIPTION OF THE DRAWINGS

FIG. 1 is a plan view of power transmission apparatus in accordance with the invention.

FIG. 2 is a front elevational view taken in longitudinal section, of power transmission apparatus in accordance with the invention.

FIG. 3 is an end elevational view of the apparatus of FIGS. 1 and 2, taken along line 3—3 of FIG. 1.

FIG. 4b is a side elevational view of the piston of FIG. 4a.

DETAILED DESCRIPTION OF PREFERRED EMBODIMENTS

Figure 4A:
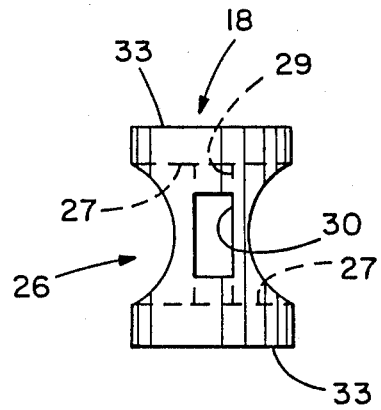
FIG. 4a is a front elevational view of one of the pistons of the apparatus of FIGS. 1 and 2.
Figure 4B:
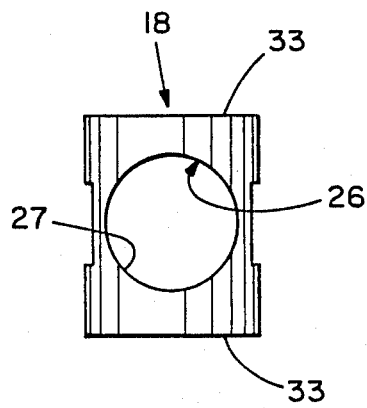
Figure 4C:
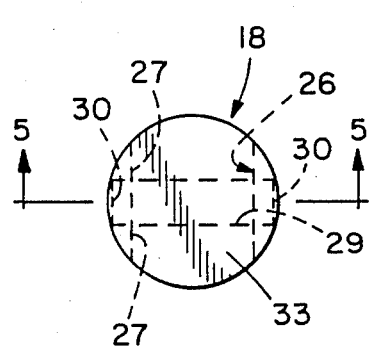
FIG. 4c is a plan view of the piston of FIG. 4B.
Figure 5:
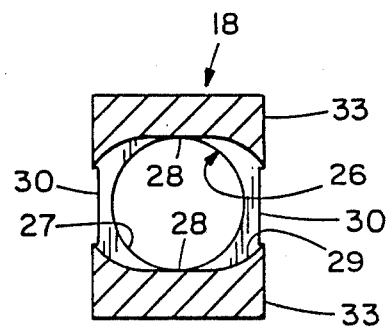
FIG. 5 is a sectional view taken substantially along line 5—5 of FIG. 4c.

The invention is generally embodied in a transmission apparatus 10 which, as illustrated in FIG. 2, includes a rotatable cylinder block 12 defining a pair of parallel cylinders 14, 16, a pair of two-headed pistons 18, 20 disposed reciprocally within the cylinders, and a rotatable camshaft 22 disposed coaxially of the cylinder block which, when rotating relative to the cylinder block 12, drives the pistons 18 and 20 in reciprocating motion. The apparatus will be described specifically with reference to an embodiment wherein the camshaft 22 is a driving member and the cylinder block 12 is the driven member; however, it should be understood that the functions can be reversed.

In one mode of operation, the transmission 10 provides a direct connection between the camshaft 22 and the cylinder block 12 so that the cylinder block 12 and camshaft 22 rotate at the same velocity. In this mode of operation, the pistons 18, 20 are prevented from moving relative to the cylinder block 12 as described below.

In a second mode of operation, the relative speeds of the camshaft 22 and the cylinder block 12 are varied with respect to one another, and the pistons 18 and 20 reciprocate at a frequency equal to the difference between their respective speeds. In the second mode, the pistons are driven in reciprocating movement 180° out of phase with one another by a pair of cams 24 disposed eccentrically on the camshaft 22 and fixed thereto. Each of the pistons 18, 20 has a uniquely-shape transverse bore 26 extending therethrough. As best illustrated in FIGS. 4a, 4b, 4c, and 5, and referring to the piston in the orientation shown in FIGS. 4b and 5, the bore 26 has portions 27 of substantially circular cross-section at its ends, and has a central counterbore 29 of non-circular cross-section. The counterbore 29 has a maximum vertical dimension equal to the diameter of the bore 26, defined by the distance between opposed substantially planar surfaces 28. The counterbore 29 extends the entire width of the piston 18, to permit side-to-side movement of the cam relative to the piston without permitting vertical movement of the cam relative to the piston and as illustrated in FIG. 4a, the piston preferably has rectangular openings or slots 30 in its sides to permit the cam to protrude therethrough at the extremities of its lateral movement with respect to the piston. The piston 18 has two heads 3 which seal against the cylinder interior. The dimension of the counterbore 29 in the direction of the axis of the camshaft 22 is slightly greater than the thickness of the cam 24.

To prevent interference between the cam 24 and the cylinder walls, the cylinder walls have cavities 31 located generally centrally thereof on each side, as illustrated in FIGS. 1 and 3.

Torque exerted on the camshaft 22 results in axial force on the pistons 18 and 20, and in torque on the cylinder block 12 that varies as a function of resistance to reciprocation of the pistons 18 and 20 within the cylinder block 12. The interiors of the adjacent ends of the cylinders communicate with one another through a pair of variable position valves 32 which regulate flow between the interiors of the adjacent ends of the cylinders by providing orifices of variable size.

To effect operation in the first mode described above, the valves 32 are closed, preventing flow between the cylinder interiors, and thereby preventing movement of the pistons 18 and 20 relative to the cylinder block 12. In this mode of operation, the cylinder block 12 rotates at a speed equal to that of the camshaft 22. To effect operation in the second mode, the valves 32 are opened to permit flow of fluid between the cylinder interiors, thus permitting reciprocation of the pistons 18 and 20 within the cylinder blocks 12 and permitting a differential between the camshaft speed and the rotational velocity of the cylinder block 12. The valves 32 are adjustable through a continuous range of open positions. This permits adjustment of flow resistance between the cylinders 14 and 16 to enable selection of a desired differential between the respective rotational velocities between the camshaft 22 and the cylinder block 12.

The valves for regulating flow between adjacent ends of the cylinders comprise a pair of gates 34 which are slidably disposed within channels 35 defined in associated cylinder heads 36. Each gate 34 has an elongated central opening 38 which is greater in length than the distance between the cylinders 14 and 16. In an open position, the opening 38 communicates with both cylinders to permit flow therebetween. V-shaped channels 39 extend from opposite ends of the opening 38 and communicate therewith to relieve unnecessary compression between the piston heads and the cylinder heads. In closed position, the opening 38 communicates with only one of the cylinders 14 or 16, thus preventing flow between the cylinders. The valve 32 is shown in an open position in FIGS. 1 and 2.

To effect synchronous action of the valves 32, the sliding gates are connected to a common pusher plate 40. Each of the gates 34 includes a connecting rod 42 which extends from the pusher plate 40 to a generally flat portion 44 of the gate 34 which defines the opening. To bias the valves toward the closed position, coil springs 46 are coaxially disposed on each of the connecting rods 42 and compressed between the plate 40 and the block 12, urging the gates 34 toward the right of FIG. 1.

Connection of the cams 24 to the camshaft 22 may be effected by any convenient means. In the illustrated embodiment, the camshaft 22 has a hexagonal portion 48 for engaging hexagonal bores in the cams 24.

Figure 6:
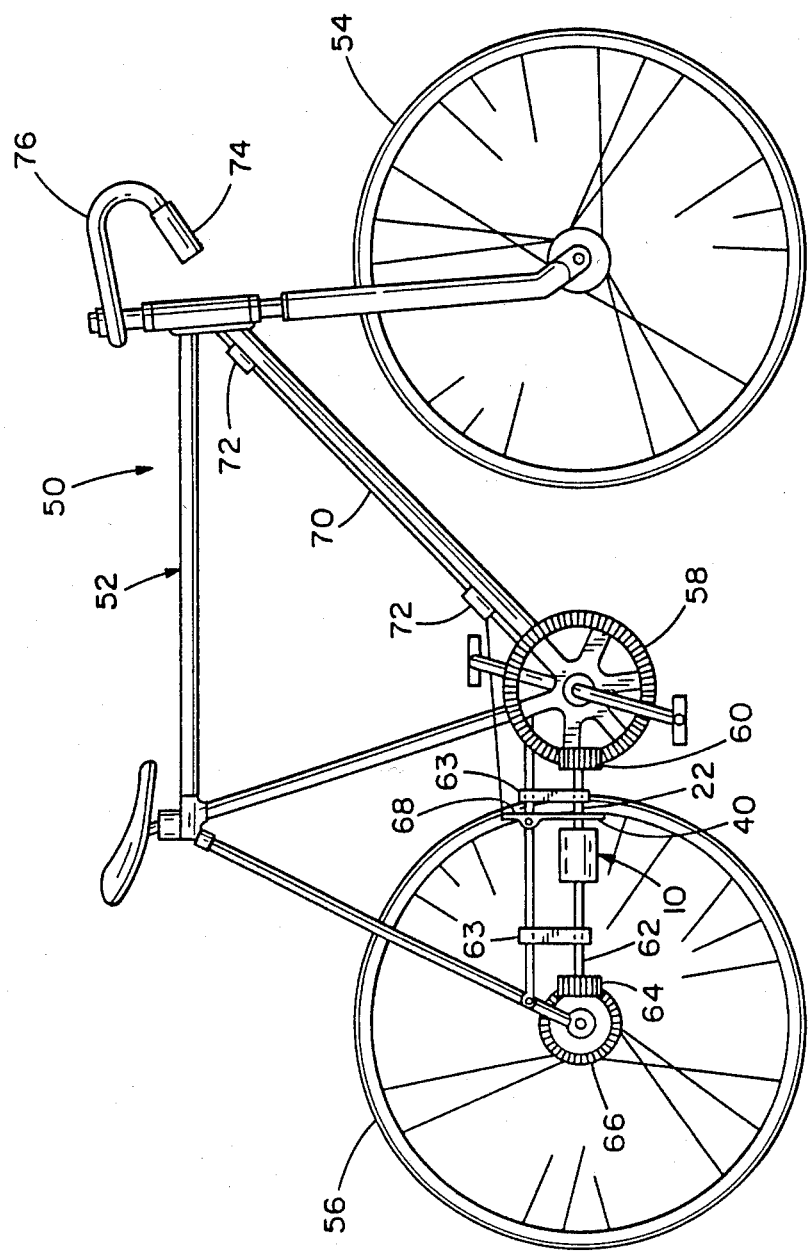
FIG. 6 is a partly diagrammatical side elevational view of a bicycle with transmission apparatus in accordance with the invention disposed thereon in combination with a shaft drive.

FIG. 6 illustrates the transmission of the invention installed on a bicycle 50. The illustrated bicycle includes a frame 52, front and rear wheels 54 and 56, and a pedal-driven crank 58 connected to the rear wheel 56 by the above-described transmission 10. The camshaft 22 extends forwardly from the cylinder block 12 toward the crank 58, and has a gear 60 fixed to its forward end for engagement with gear teeth on the crank 58. A second shaft 62 extends rearwardly from the cylinder block 12 and has a gear 66 on its rearward end to mesh with a gear 64 on the rear wheel 56. The shafts 22 and 62 are supported by brackets 63a and 63b. A valve-actuating lever 68 is pivoted on a horizontal frame member to engage the pusher plate 40. The upper end of the valve-actuating lever 68 is connected to a cable 70 which runs through guides 72 to a rotatable grip 74 on the handle bars 76. Rotation of the grip 74 controls tension on the cable 70, thus controlling the valve position.

Figure 7:
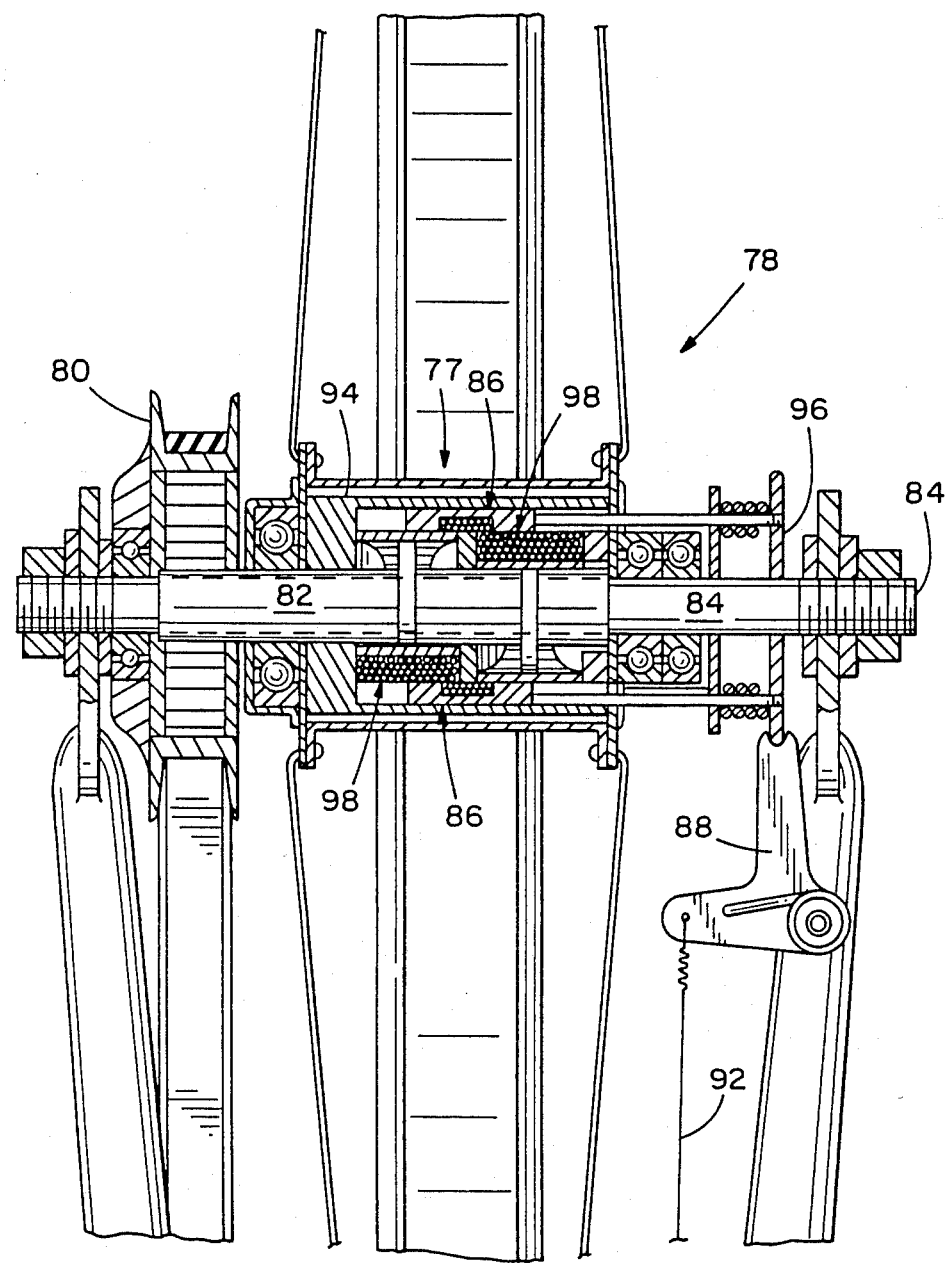
FIG. 7 is a longitudinal sectional view of power transmission apparatus in accordance with the invention shown installed in the rear drive wheel of a bicycle.

An alternative arrangement for mounting the transmission of the invention on a bicycle is illustrated by FIG. 7, wherein the transmission is disposed in the hub 77 of a bicycle rear wheel 78. In this embodiment, power is transmitted to the rear wheel 78 via a belt drive. The belt drive includes a pulley 80 mounted on the rear wheel 78 keyed or otherwise fixed to the camshaft 82. The camshaft 82 is tubular, and is slidably and coaxially disposed on the rear axle 84. The cylinder block 94 is rotatably supported by bearings 86, 88 so that it may rotate relative to the camshaft 82 and the rear axle 84.

The valves 86 are actuated by a bell crank 88 which is pivoted on a frame member 90 and actuated by a cable 92 in a manner similar to that described in connection with the embodiment of FIG. 6. One arm of the bell crank 88 is connected to the pusher plate 96 while the other is connected to the cable 92.

In the embodiment of FIG. 7, the fluid displaced by the pistons comprises a slurry 98 composed of a plurality of relatively small solid spheres immersed in a fluid such as oil. In this embodiment, the oil or other fluid essentially functions as a lubricant, and compressive forces are transmitted through the spheres. This provides an advantage over the use of a hydraulic fluid rather than the slurry in that leakage problems are minimized. The resistance to movement of the pistons is provided by compressive force transmitted through the spheres, rather than by fluid pressure.

The spheres are preferably of between 0.030 and 0.050 in. in diameter. In one embodiment, plastic spheres of between 0.015 and 0.050 in. are used. In another embodiment, the spheres comprise copper shot of 0.017 in. diameter.

From the foregoing it will be appreciated that the present invention provides a novel and useful power transmission apparatus which may be particularly suitable for use in transmitting power from the pedals to the rear wheel of a bicycle. The invention is not limited to the embodiments described above, but rather is defined by the following claims.

What is claimed is:

1. Transmission apparatus comprising:
   a cylinder block defining a pair of hollow cylinders;
   a pair of double-acting pistons disposed for reciprocation in said cylinders, each piston having a non-circular transverse bore extending therethrough;
   a camshaft assembly comprising a shaft extending through the bores of said pistons and a pair of eccentric cams, each cam being fixed to said shaft and engaging a respective one of said bores;
   valve means connecting said cylinders with one another to permit reciprocating flow therebetween in response to reciprocation of said pistons, and enabling variable control of flow between said cylinders;
   said cams being disposed on said shaft so as to drive said pistons in reciprocating motion 180° out of phase with each other during rotation of said camshaft relative to said cylinder block;
   a slurry disposed within said cylinders so as to be pumped between the respective cylinders by reciprocation of the pistons, said slurry comprising a plurality of solid spheres of relatively small diameter and a lubricating fluid.

2. Apparatus in accordance with claim 1 wherein said spheres have diameters between 0.015 in. and 0.050 in.

3. Transmission apparatus comprising:
   a cylinder block defining a pair of hollow cylinders;
   a pair of two-headed pistons disposed for reciprocation in said cylinders, each piston having an interior surface defining a non-circular transverse bore extending therethrough;
   a camshaft assembly comprising a shaft extending through the bores of said pistons and a pair of eccentric cams, each cam being fixed to said shaft and directly engaging the interior surface of a respective one of said pistons;
   valve means connecting said cylinders with one another and enabling variable control of fluid flow between said cylinders; and
   a displaceable material disposed within said cylinders;
   said cams being disposed on said shaft so as to drive said pistons in reciprocating motion 180° out of phase with each other during rotation of said relative to said cylinder block;
   each said cam having a substantially cylindrical peripheral surface, with a predetermined diameter;
   said cylinders defining parallel axes extending in the direction of travel of said pistons relative to said cylinders, substantially perpendicular to said shaft, each said cylinder defining two separate chambers, one adjacent each piston head, for receiving said displaceable material;
   each of said bores through said pistons including a portion disposed internally of the piston having a first dimension, along an axis substantially perpendicular both to said axes of said cylinders and to said shaft, greater than said diameter of said cams, to permit transverse movement of said cams relative to said pistons, and a second dimension, along an axis substantially parallel to the axes of said cylinders, substantially equal to the diameter of said cams to minimize lost motion between said bores and said cams in the direction of movement of the pistons;
   said displaceable material comprising a plurality of solid spheres and a lubricating material which facilitates movement of said spheres.

4. Transmission apparatus comprising:
   cylinder block defining a pair of hollow cylinders;
   a pair of two-headed pistons disposed for reciprocation in said cylinders, each piston having a transverse bore extending therethrough;
   a displaceable material disposed within said cylinders comprising a plurality of solid spheres and a lubricating material for facilitating flow of said displaceable material;
   a camshaft assembly comprising a shaft extending through the bores of said pistons and a pair of eccentric cams, each cam being fixed to said shaft and engaging a respective one of said bores;
   valve means connecting said cylinders with one another and enabling variable control of [fluid] flow between said cylinders;
   said cams being disposed on said shaft so as to drive said pistons in reciprocating motion 180° out of phase with each other during rotation of said ca relative to said cylinder block;
   said valve means comprising a pair of plates, each having an elongated cavity therein and being slidably mounted so that it may be moved between open positions wherein said elongated cavity communicates with both of said cylinders so as to permit [fluid] flow therebetween and a closed position wherein said elongated cavity communicates with only one of said cylinders, and cavity cooperating with said cylinders to define a restricted orifice of variable size for flow between said cylinders;
   whereby, when said valve means is in closed position said cylinder block and said camshaft rotate at identical velocities, and when said valve means is in an open position, said camshaft may rotate with respect to said cylinder block while transmitting torque thereto.

5. A bicycle comprising frame means, a pedal-driven crank rotatably mounted thereon, a rear drive wheel, and transmission means including the apparatus of claim 4 connecting said crank and said rear drive wheel.

* * * * *

UNITED STATES PATENT AND TRADEMARK OFFICE
CERTIFICATE OF CORRECTION

PATENT NO. : 4,795,014

DATED : January 3, 1989

INVENTOR(S) : Lawrence M. Rheingold

It is certified that error appears in the above-identified patent and that said Letters Patent is hereby corrected as shown below:

Column 3, line 7, change "uniquely-shape" to --uniquely-shaped--.

Column 3, line 24, change "3" to --33--.

Column 5, line 54, after "said" insert --camshaft--.

Column 6, line 34, after "of" delete "[fluid]".

Column 6, line 38, change "ca" to --camshaft--.

Column 6, line 45, after "permit" delete "[fluid]".

Signed and Sealed this

Thirteenth Day of June, 1989

Attest:

DONALD J. QUIGG

*Attesting Officer*      *Commissioner of Patents and Trademarks*